United States Patent [19]

Lindner

[11] 4,332,702
[45] Jun. 1, 1982

[54] POLYVINYL CHLORIDE COMPOSITIONS AND PROCESSING

[75] Inventor: Robert A. Lindner, Newburg, N.Y.

[73] Assignee: Henkel Corporation, Minneapolis, Minn.

[21] Appl. No.: 223,886

[22] Filed: Jan. 12, 1981

[51] Int. Cl.³ .............................. C08K 5/09; C08K 5/10; C08K 5/57

[52] U.S. Cl. ............................ 524/178; 260/45.85 R; 560/263; 524/310; 524/394

[58] Field of Search .................. 560/263; 260/23 XA, 260/45.85 R

[56] References Cited

U.S. PATENT DOCUMENTS

| | | | |
|---|---|---|---|
| 2,356,745 | 8/1944 | Barth et al. | 560/263 |
| 2,381,247 | 8/1945 | Barth et al. | 560/263 |
| 2,958,706 | 11/1960 | Hurwitz et al. | 560/263 |
| 3,632,538 | 1/1972 | Kauder | 260/23 XA |
| 3,670,013 | 6/1972 | Leibfried | 560/263 |
| 4,239,679 | 12/1980 | Rolls et al. | 260/23 XA |
| 4,248,747 | 2/1981 | Washecheck et al. | 260/23 XA |
| 4,269,743 | 5/1981 | Hulyalkar et al. | 260/23 XA |

FOREIGN PATENT DOCUMENTS

| | | | |
|---|---|---|---|
| 55-3437 | 1/1980 | Japan | 560/263 |
| 663566 | 12/1951 | United Kingdom | 560/263 |

Primary Examiner—Ronald W. Griffin
Attorney, Agent, or Firm—Forrest L. Collins; Patrick J. Span

[57] ABSTRACT

The present invention describes the use of particular partial esters of pentaerythritol as agents for lowering the viscosity of polyvinyl chloride resin materials.

13 Claims, No Drawings

POLYVINYL CHLORIDE COMPOSITIONS AND PROCESSING

FIELD OF THE INVENTION

The present invention describes products and processes useful in the handling of polyvinyl chloride resins.

DESCRIPTION OF THE ART PRACTICES

It is known in the art that polyvinyl chloride when formed into articles degrades rapidly due to the presence of hydrogen chloride liberated from the resin. The degradation is basically a thermal process, however, the formation of the hydrochloric acid tends to further destabilize the composition thus causing further degradation. The hydrogen chloride liberated may be controlled through a variety of methods, however, only those which do not themselves cause further problems with the polyvinyl chloride resin or destroy the utility of the article are considered feasible.

Among the methods known to control the degradation of polyvinyl chloride resins are the use of materials such as heavy metal salts including calcium, lead and zinc. Most preferably, the salts used are the soaps i.e. calcium or zinc stearate. While lead compounds may be used, their toxicity inhibits such utilization. A lesser used method of controlling the hydrogen chloride formation in polyvinyl chloride resins is through the use of organo-tin salts such as dibutyl-tin or dioctyl tin diglycolate. The tin salts are much less effective than the calcium fatty acid salts, however, their much lower toxicity and the absence of lubricating ability in the polyvinyl chloride make them desirable for a number of operations such as molding, extruding or calendering.

It has now been found that partial esters of pentaerythritol also referred to as tetrakis(hydroxymethyl)methane or 2,2-bishydroxymethyl-1,3-propanediol are highly useful in substantially lowering the viscosity by the means of internal lubrication. That is, the useful effect of the heavy metal salts is somewhat dependent on their ability to become a part of the homogeneous system in the mold. That is, the metal salts which are known to be external lubricants are gummy materials which do not blend easily with the polyvinyl chloride. The use of the partial esters has a solvating effect on the metal salts thereby functioning to give a homogeneous system.

Even when the amount of metal salts is lowered, the system becomes one which is not easily processed. Lower amounts of the metal salt also cause less stabilizing effect which is the primary reason for adding the metal salt in the first instance.

The deficiency in the use of metal salts is somewhat made up by including an organo-tin compound. However, the organo-tin compounds do not function as well as the metal salts in scavenging Hcl and, moreover, exhibit no external lubricity.

It has now been found that external lubricity, internal lubricity and Hcl control may be obtained in a polyvinyl chloride resin system using a unique three part system. The partial ester, as later described, allows large amounts of the heavy metal salts to be employed as external lubricants and as Hcl scavengers. The remaining need for Hcl scavenging is controlled by use of an organo-tin compound. The partial ester used for internal lubrication also contributes greatly to Hcl scavenging.

Throughout the specification and claims, percentages and ratios are by weight and temperatures are in degrees Celsius unless otherwise noted.

SUMMARY OF THE INVENTION

The present invention describes the partial esters of pentaerythritol which are useful for internal lubricating functions and also to function as hydrogen chloride scavengers in a polyvinyl chloride product such compounds are further described as:

a partial ester of 2,2-bishydroxymethyl-1,3-propanediol which contains as the saturated fatty acid portion of said ester the following components:
  (a) from 0 to 10 percent of 14 carbon fatty acid;
  (b) 0 to 5 percent of 15 carbon fatty acid;
  (c) 30 to 60 percent of 16 carbon fatty acid;
  (d) 0 to 5 percent of 17 carbon fatty acid; and
  (e) 30 to 60 percent 18 carbon fatty acid reacted to give from 25 to 45 percent monoester, from 40 to 60 percent diester and from about 15 to about 30 percent triester, such that said partial ester is substantially free of unreacted 2,2-bishydroxymethyl-1,3-propanediol and substantially free of the tetraester.

The present invention further describes a process for manufacturing polyvinyl chloride products wherein a composition is formed containing as required components:
  (a) an organo-tin compound as a primary stabilizer to retard against hydrogen chloride degradation of the product;
  (b) a polyvinyl chloride resin and;
  (c) as an extender stabilizer a calcium fatty acid, the improvements therein comprising the addition of an effective amount of a partial ester of:

2,2-bishydroxymethyl-1,3-propanediol which contains as the saturated fatty acid portion of said ester the following components:
  (a) from 0 to 10 percent of 14 carbon fatty acid;
  (b) 0 to 5 percent of 15 carbon fatty acid;
  (c) 30 to 60 percent of 16 carbon fatty acid;
  (d) 0 to 5 percent of 17 carbon fatty acid; and
  (e) 30 to 60 percent of 18 carbon fatty acid reacted to give from 20 to 50 percent monoester, from 35 to 65 percent diester and from about 10 to about 35 percent triester, such that said partial ester is substantially free of unreacted 2,2-bishydroxymethyl-1,3-propanediol and substantially free of the tetraester, to substantially lower the viscosity of said composition during formation of the polyvinyl chloride product and to retard degradation of the product.

DETAILED DESCRIPTION OF THE INVENTION

The present invention, as previously noted, relates to the process of manufacturing a polyvinyl chloride compound containing therein a primary organo-tin stabilizer and a partial ester as more particularly described later which functions as an internal lubricant during a calendering operation and which also functions as a co-stabilizer.

The unique compound which functions as an internal lubricant and as a co-stabilizer in the organo-tin stabilizer polyvinyl chloride system is a partial ester of pentaerythritol as described below. The basic description of the partial ester is made in the Summary of the Invention and the reader is referred thereto.

The fatty acid distributions which have been found particularly useful are from about 0 percent to about 10 percent by weight of the 14 carbon fatty acid; from about 0 percent to about 8 percent of the 15 carbon fatty acid; from about 30 percent to about 70 percent of the 16 carbon fatty acid; from about 0 percent to about 8 percent of the 17 carbon acid and from about 30 percent to about 70 percent by weight of the 18 carbon acid. More preferably, the distribution of the acid chain lengths utilized in the partial ester are from about 1 percent to about 5 percent by weight of the 14 carbon fatty acid; from about 0.1 percent to about 5 percent of the 15 carbon fatty acid; from about 35 percent to about 55 percent of the 16 carbon fatty acid; from about 1 percent to about 5 percent of the 17 carbon fatty acid and from about 40 percent to about 55 percent by weight of the 18 carbon acid. The chain length of the fatty acid is essential to ensure that the proper internal lubricating effect is obtained. Higher or lower fatty acids give unpredictable lubricating effects and are thus not as useful as the blends described herein.

The partial ester of the pentaerythritol is so formed such that the partial ester will be substantially free of the unreacted pentaerythritol and substantial free of the pentaester. Neither of these compounds is particularly useful compared to the resultant mixture of partial esters which give both an internal lubricating and co-stabilizing effect. The partial ester is preferably so formed to provide from about 25 percent to about 45 percent by weight of the monoester; from about 40 percent to about 60 percent of the diester and from about 15 percent to about 30 percent by weight of the triester. More preferably, the ratio of the mono-, di- and tri-partial esters of pentaerythritol is from about 27 percent to about 35 percent by weight of the monoester; from about 45 percent to about 55 percent by weight of the diester; and from about 18 percent to about 23 percent by weight of the triester. It is particularly preferred that the foregoing composition as previously noted be substantially free of the tetraester. This compound, however, has been found to be capable of being present at levels of up to 5 percent by weight, preferably not greater than 3.5 percent by weight of the polyvinyl chloride compound without causing substantial difficulties in the processing.

It is also highly desired that the polyvinyl chloride compound be substantially free of fatty acids as these compounds may form soaps thereby leading to unwanted lubricating effect and lack of clarity in clear articles.

The tin compounds of the present invention are conveniently dioctyl tin and dibutyl tin and mixtures thereof. Other suitable organo-tin compounds which may be used in the present invention include: dimethyl tin and dilauryl tin all of which are usually used as the thioglycolate. The organo-tin is conveniently used at levels of 0.3 to 5 percent, preferably 0.5 to 2.5 percent by weight of the polyvinyl chloride compound.

The tin compounds are used to stabilize the clear polyvinyl chloride products used for example in blister packaging. The partial esters of the present invention are obtained by reacting the desired mixture of fatty acids with the pentaerythritol. It is highly preferred that the hydroxyl number of said compounds be in the range of 190 to 210 and most preferably from 195 to 205. The reaction to form the pentaerythritol esters as previously noted involves obtaining the desired fatty acid chain length mixture and thereafter reacting it with pentaerythritol. This reaction proceeds at a temperature of from about 140 degrees C. to about 220 degrees C. and is complete in about 3 to 8 hours. The pentaerythritol is added to a mixing pot containing the fatty acids while exercising control on the rate of reaction. By controlling the rate of reaction, it is assured that substantially all of the pentaerythritol present is converted to the monoester. Thereafter, the monoester is converted to the diester and higher esters.

The utilization of the compounds of the present invention as previously noted is particularly for calendering operations. Calendering is an operation where the polyvinyl chloride resin is compressed between rollers and formed into sheets which are then formed into the desired article containing the polyvinyl chloride resin. As calendering operations are well known in the art, no particular description is given of the utilization of the compounds of the present invention in the calendering operation. It is sufficient to say that the compositions utilized in the process of the present invention are useful throughout the calendering industry. The calendering operation is initiated by mixing the polyvinyl chloride resin with the organo-tin stabilizer and the partial ester in the required amounts and thereafter thoroughly mixing such composition together and heating prior to delivery to the calendering roll.

The last required component of the present invention is a calcium fatty acid salt more commonly referred to as a calcium soap. Any of the commonly utilized calcium soaps may be employed, preferably calcium stearate although calcium laurate, calcium myristate or calcium palmitate may be used. The purpose, as previously described for utilizing the calcium fatty acid, is to provide an extension of the stabilizing effect of the organo-tin compound in the polyvinyl chloride resin. The level of the calcium fatty acid salt utilized is preferably from 0.3 percent to about 3 percent by weight of the polyvinyl chloride product. Most preferably, this percentage is from about 0.5 percent to about 1.5 percent by weight of the polyvinyl chloride. The calcium fatty acid salts may be obtained commercially from several sources.

The polyvinyl chloride product of the present invention is combined by mixing the polyvinyl chloride, the organo-tin compound, the calcium fatty acid and the partial ester of pentaerythritol together in a convenient mixing vat. The product is thereafter used in molding, extruding or calendering according to known art principles.

The following are examples of the present invention.

EXAMPLE I

A partial ester of pentaerythritol which is very useful as an internal lubricant and as a co-stabilizer in organo-tin stabilized polyvinyl chloride clear plastics is formed as follows.

A saturated fatty acid having the following acid chain length distribution is obtained.

| Percent by Weight | |
|---|---|
| 3 | C14 Fatty Acid |
| 0.5 | C15 Fatty Acid |
| 42.5 | C16 Fatty Acid |
| 2 | C17 Fatty Acid |
| 52 | C18 Fatty Acid |

The fatty acid so obtained is reacted under vacuum (with prior nitrogen sparge) at 77.66 parts by weight thereof with 29.22 parts by weight of pentaerythritol. Tin oxide is used as a catalyst at 0.05 parts. The resulting ester, following a reaction time of about 4 hours at 190 degrees C., is a compound which contains 30 percent monoester, 50 percent diester and 20 percent triester.

The partial ester has a melt point of 50–55 degrees C. The reaction is conducted such that the compound is substantially free of free fatty acids with an acceptable acid number of less than 2.5, in this case 0.9. The saponification number should be in the range of 160 to 180 and is in this example 177.5 with a hydroxyl number of 200. The composition is substantially free of any unreacted pentaerythritol. The tetraester is not found in significant amounts in the composition.

This Example may be varied by employing a substantially pure fatty acid mixture containing 55 parts 18 carbon acid and 45 parts 16 carbon acid.

EXAMPLE II

The partial ester of Example I is utilized to obtain a lower melt viscosity in a polyvinyl chloride composition containing calcium stearate and an organo-tin stabilizer.

Polyvinyl chloride pipe fittings utilizing the above technology are formulated as follows.

TABLE I

|  | A | B | C | D | E | F |
|---|---|---|---|---|---|---|
| SCC 614 - a polyvinyl chloride resin obtained from Stauffer | 100.0 | 100.0 | 100.0 | 100.0 | 100.0 | 100.0 |
| KM 611 - an acrylic modifier for polyvinyl resins available from Rohm & Haas | 3.0 | 3.0 | 3.0 | 3.0 | 3.0 | 3.0 |
| K 120N Rohm & Haas resin used to modify polyvinyl chloride resins | 1.5 | 1.5 | 1.5 | 1.5 | 1.5 | 1.5 |
| HiFlex 100 Calcium carbonate filler | 3.0 | 3.0 | 3.0 | 3.0 | 3.0 | 3.0 |
| Titanium Dioxide pigment | 1.0 | 1.0 | 1.0 | 1.0 | 1.0 | 1.0 |
| Ti33 (butyl tin stabilizer) | 1.6 | 1.6 | 1.6 | 1.6 | 1.6 | 1.6 |
| Calcium stearate | .7 | .7 | .7 | .7 | .7 | — |
| Loxiol G30 ® stearyl stearate | .7 | — | — | — | — | — |
| Loxiol G33 ® hydrogenated tallow stearate | — | .7 | — | — | — | — |
| Loxiol Hob 7121 (Ex. I) | — | — | .7 | — | — | — |
| VPT 1563 Part A (2.2 pentaerythritol ester substituted with stearic fatty acid) | — | — | — | .7 | — | — |
| Loxiol G70 ® | 0.3 | 0.3 | 0.3 | 0.3 | 0.3 | 0.3 |

The preceding combinations are formulated by compounding the ingredients together and thereafter placing the product in a mold.

The following results are obtained from the preceding example as shown in Table II while the product is in a plastic state.

TABLE II

|  | A | B | C | D | E | F |
|---|---|---|---|---|---|---|
| Brabender stability time at 190 degrees C. 60 rpm | 24.5 | 26.5 | 29.0 | 28.9 | 22.5 | 23.0 |
| Fusion time at 90 degrees C. 60 rpm | .4 | .4 | .4 | .5 | .3 | .2 |
| Torque at fusion maximum | 3800 | 3550 | 3600 | 3450 | 3850 | 4000 |
| Equilbrium torque at 10 minutes | 2100 | 2100 | 2100 | 2050 | 2150 | 2000 |
| Izod Impact (A.S.T.M. D 246) |  |  |  |  |  |  |
| Trial I | .5 | .55 | .55 | .55 | — | — |
| Trial II | .5 | .5 | .57 | .51 | — | — |
| Heat Distortion Temperature (A.S.T.M. D 648-72) |  |  |  |  |  |  |
| Trial I | 65.0 | 69.0 | 67.0 | 64.5 | 70.5 |  |
| Trial II | 68.5 | 68.5 | 69.0 | 68.0 | 66.5 |  |
| Spriral Flow Mold | 14.76 | 14.44 | 15.27 | 15.37 | — | — |

The foregoing results show the superiority of the products C and D manufactured according to the present invention. In particular, the author directs the readers attention to the spiral flow mold tests showing increased time to obtain the filling of an extrusion apparatus. This is particularly valuable in that the extrusion apparatus is set to fill at a given time. The spiral flow mold tests indicate this product will fill rapidly and extrude rapidly allowing good product formation.

What is claimed is:

1. A partial ester of pentaerythritol which is useful for internal lubricating functions and also to function as a hydrogen chloride scavenger in a polyvinyl chloride product such compound is further described as:
   a partial ester of 2,2-bishydroxymethyl-1,3-propanediol which contains as the saturated fatty acid portion of said ester the following components:

(a) from 0 to 10 percent of 14 carbon fatty acid;
(b) 0 to 5 percent of 15 carbon fatty acid;
(c) 30 to 60 percent of 16 carbon fatty acid;
(d) 0 to 5 percent of 17 carbon fatty acid; and
(e) 30 to 60 percent 18 carbon fatty acid
reacted to give from 25 to 45 percent monoester, from 40 to 60 percent diester and from about 15 to about 30 percent triester, such that said partial ester is substantially free of unreacted 2,2-bishydroxymethyl-1,3-propanediol and substantially free of the tetraester.

2. The compositions of claim 1 which is substantially free of fatty acids.

3. The composition of claim 1 wherein the content of 16 carbon fatty acids is from about 35 to about 55 percent and the content of 18 carbon fatty acids is from about 40 to about 55 percent.

4. The composition of claim 1 wherein the partial ester contains from about 27 to about 35 percent by weight monoester, from 45 percent to about 55 percent by weight diester and from about 18 percent to about 23 percent by weight triester.

5. A process for manufacturing polyvinyl chloride products wherein a composition is formed containing as required components:
(a) an organo-tin compound as a primary stabilizer to retard against hydrogen chloride degradation of the product;
(b) a polyvinyl chloride resin and;
(c) as an extender stabilizer a calcium fatty acid, the improvement therein comprising the addition of an effective amount of a partial ester of:
2,2-bishydroxymethyl-1,3-propanediol which contains as the saturated fatty acid portion of said ester the following components:
(a) from 0 to 10 percent of 14 carbon saturated acid;
(b) 0 to 8 percent of 15 carbon saturated acid;
(c) 30 to 70 percent of 16 carbon saturated acid;
(d) 0 to 8 percent of 17 carbon saturated acid; and
(e) 30 to 70 percent of 18 carbon saturated acid
reacted to give from 20 to 50 percent monoester, from 35 to 65 percent diester and from about 10 to about 35 percent triester, such that said partial ester is substantially free of unreacted 2,2-bishydroxymethyl-1,3-propanediol and substantially free of the tetraester thereby lowering the viscosity of said composition during formation of the polyvinyl chloride product.

6. The process of claim 5 wherein the partial ester is present at from about 0.1 percent to about 5.0 percent by weight of the total composition.

7. The process of claim 5 wherein the acid portion of the partial ester has the following carbon chain length distribution:
(a) 0 percent to 10 percent by weight 14 carbon saturated fatty acid;
(b) 0 percent to 5 percent by weight 15 carbon saturated fatty acid;
(c) 30 percent to 60 percent by weight 16 carbon saturated fatty acid;
(d) 0 percent to 5 percent by weight 17 carbon saturated fatty acid;
(e) 30 percent to 60 percent by weight 18 carbon saturated fatty acid.

8. The composition of claim 5 wherein the partial ester is present at from about 0.2 percent to about 3.0 percent by weight of the polyvinyl chloride product.

9. The process of claim 5 wherein the acid portion of the partial ester has the following carbon chain length distribution:
(a) 1 percent to 5 percent by weight 14 carbon saturated fatty acid;
(b) 0.1 percent to 5 percent by weight 15 carbon saturated fatty acid;
(c) 35 percent to 55 percent by weight 16 carbon saturated fatty acid;
(d) 1 percent to 5 percent by weight 17 carbon saturated fatty acid;
(e) 40 percent to 55 percent by weight 18 carbon saturated fatty acid;

10. The process of claim 5 wherein the polyvinyl chloride product is substantially free of fatty acids.

11. The process of claim 5 wherein the calcium fatty acid is calcium stearate.

12. The process of claim 5 wherein the amount of the calcium fatty acid present is at from about 0.3 percent to about 2.0 percent by weight of the polyvinyl chloride product.

13. The process of claim 5 wherein the polyvinyl chloride product is formed through a member selected from the group consisting of molding, extruding or calendering.

* * * * *